United States Patent
Ling

(10) Patent No.: US 9,819,020 B2
(45) Date of Patent: Nov. 14, 2017

(54) FEW-LAYERED $TIS_2$ AS LI-ION BATTERY ANODE

(71) Applicant: Toyota Motor Engineering & Manufacturing North America, Inc., Erlanger, KY (US)

(72) Inventor: Chen Ling, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 90 days.

(21) Appl. No.: 14/788,996

(22) Filed: Jul. 1, 2015

(65) Prior Publication Data

US 2017/0005336 A1    Jan. 5, 2017

(51) Int. Cl.
| | |
|---|---|
| *H01M 4/58* | (2010.01) |
| *H01M 10/054* | (2010.01) |
| *H01M 10/052* | (2010.01) |
| *H01M 4/02* | (2006.01) |

(52) U.S. Cl.
CPC ....... *H01M 4/5815* (2013.01); *H01M 10/052* (2013.01); *H01M 10/054* (2013.01); *H01M 2004/027* (2013.01)

(58) Field of Classification Search
None
See application file for complete search history.

(56) References Cited

U.S. PATENT DOCUMENTS

2014/0065465 A1 *  3/2014  Johnson ............. H01M 10/056
                                                      429/158

FOREIGN PATENT DOCUMENTS

WO    2015021056 A2    2/2015

OTHER PUBLICATIONS

"Rechargeable Li-Ion Cells Containing TiS2 Anodes," NASA Tech Brief. Published Jun. 1, 2001. Accessed Nov. 23, 2016 at: <<http://www.techbriefs.com/component/content/article/ntb/tach-briefs/materials/7362>>.*
Wang et al. "Physical and chemical tuning of two-dimensional transition metal dichalcogenides" Chem. Soc. Rev. Dec. 4, 2014.*
Yang et al. "Two-Dimensional Transition Metal dichalcogenide Monolayers as Promising Sodium Ion Battery Anodes" Fournal of Physical Chemistry 2015, 119, 26374-26380.*
Muller, "High Performance Pseduocapacitor Based on 2D Layered Metal Chalcogenide Nanocrystals", Nano Letters, (Feb. 5, 2015), pp. 1911-1917, v.15, The American Chemical Society, U.S.A.
Van Der Ven et al., "First-principals investigation of phase stability in LixCoO2", Physical Review B, (1998), pp. 2075-2987, v. 58, No. 6, The Americal Physical Society, U.S.A.
Chhowalla et al., "The chemistry of two-dimensional layered transition metal dichalcogenide nanosheets", Nature Chemistry, (2013), pp. 263-275, Nature Publishing Group, London.

(Continued)

*Primary Examiner* — Alix Eggerding
(74) *Attorney, Agent, or Firm* — Christopher G. Darrow; Darrow Mustafa PC

(57) ABSTRACT

An electrochemical cell having an anode containing few-layered transition metal dichalcogenide is disclosed. The few-layered configuration of the transition metal dichalcogenide causes the material to have relatively low electric potential, enabling its use opposite a wide variety of cathode materials. In general, the few-layer configuration allows deployment as anode material of transition metal dichalcogenides that would typically otherwise be limited to use as cathode materials.

19 Claims, 3 Drawing Sheets

(56) References Cited

OTHER PUBLICATIONS

Chen et al., "Characterization of TiS2 as an Anode Material for Lithium Ion Batteries", Acta Physico-Chimica Sinica, (2011), pp. 97-102, v. 27, Peking University, China.
Fang et al., "Synthesis and Electrochemical Performance of Graphene-like WS2", Chemistry—A European Journal, (2013), pp. 5694-5700, v. 19, Wiley-VCH, Germany.

* cited by examiner

US 9,819,020 B2

FEW-LAYERED TIS₂ AS LI-ION BATTERY ANODE

TECHNICAL FIELD

The present disclosure relates to anode materials for electrochemical cells, the anode materials including transition metal dichalcogenides having a small number of layers.

BACKGROUND

Li-ion batteries are the predominant form of energy storage in personal electronic device applications. A typical Li-ion battery is composed of a positive electrode (cathode), a negative electrode (anode), an electrolyte, and other accessories. The simplest anode material, lithium metal, suffers from safety issues due to uneven or dendritic deposition during battery charging. Thus lithium metal anodes have become disfavored for many applications despite their high capacity and low electric potential, the latter providing a maximal potential difference across the cell. Current state-of-the-art anode material is graphite, an insertion-type anode, which only delivers a capacity of ~370 mAh/g. In addition, the low electric potential for lithiation of graphite (~0.1 V vs. Li/Li$^+$) can lead to surface deposition, raising the same safety concerns at high current density operation that are present for lithium metal anodes. While numerous possible anode materials have been proposed as replacements for graphite, including examples such as Si and $Li_4Ti_5O_{12}$, the discovery and development of additional anode materials having high capacity and useable lithiation potential for lithium-ion cells remains an important field.

Bulk $TiS_2$ is the first electrode material to have been tested in a Li-ion cell, in the late 1970s. The lithiation of bulk $TiS_2$ occurs at ~2.1 V vs. Li/Li$^+$, however, which indicates that bulk $TiS_2$ can only serve as a cathode material.

SUMMARY

The present disclosure provides electrochemical cells having anode materials that include few-layer transition metal dichalcogenide.

In one aspect, an electrochemical cell is disclosed, having a cathode; an anode having a transition metal dichalcogenide configured in stacks having fewer than ten layers; and an electrolyte in ionic communication with at least one of the cathode and the anode.

In another aspect, a lithium-ion electrochemical cell is disclosed, having a cathode; an anode having a transition metal dichalcogenide configured in stacks having fewer than five layers; and an electrolyte in ionic communication with at least one of the cathode and the anode.

In another aspect, a method for fabricating an electrochemical cell is disclosed. The method includes a step of placing a cathode in electrical communication with an anode having a transition metal dichalcogenide configured in stacks having fewer than five layers.

BRIEF DESCRIPTION OF THE DRAWINGS

Various aspects and advantages of the disclosure will become apparent and more readily appreciated from the following description of the various aspects taken in conjunction with the accompanying drawings, of which.

DETAILED DESCRIPTION

The present disclosure provides anode compositions having transition metal dichalcogenides present in a few-layer configuration. The disclosure also provides electrochemical cells, particularly lithium ion cells, that include such anode compositions.

A disclosed anode composition includes a transition metal dichalcogenide having a few-layer configuration. The transition metal dichalcogenides of the present disclosure, when present in a few-layer configuration, are shown to have a low electric potential of cation intercalation/deintercalation relative to the otherwise equivalent transition metal dichalcogenides in a bulk configuration. This enables such materials, which are otherwise limited to use as cathode materials due to their high electric potential of cation intercalation/deintercalation, to be employed as anode materials. This also broadens the range of cathode materials that can be employed opposite such anodes.

A transition metal dichalcogenide of the present disclosure has a formula $MX_2$, where M is a transition metal and X is any of sulfur, selenium, and tellurium. A transition metal is any D-block element of periods 3-12. In some implementations, a transition metal dichalcogenide can be a transition metal sulfide, and in some particular implementations is titanium sulfide ($TiS_2$).

Figure 1A:
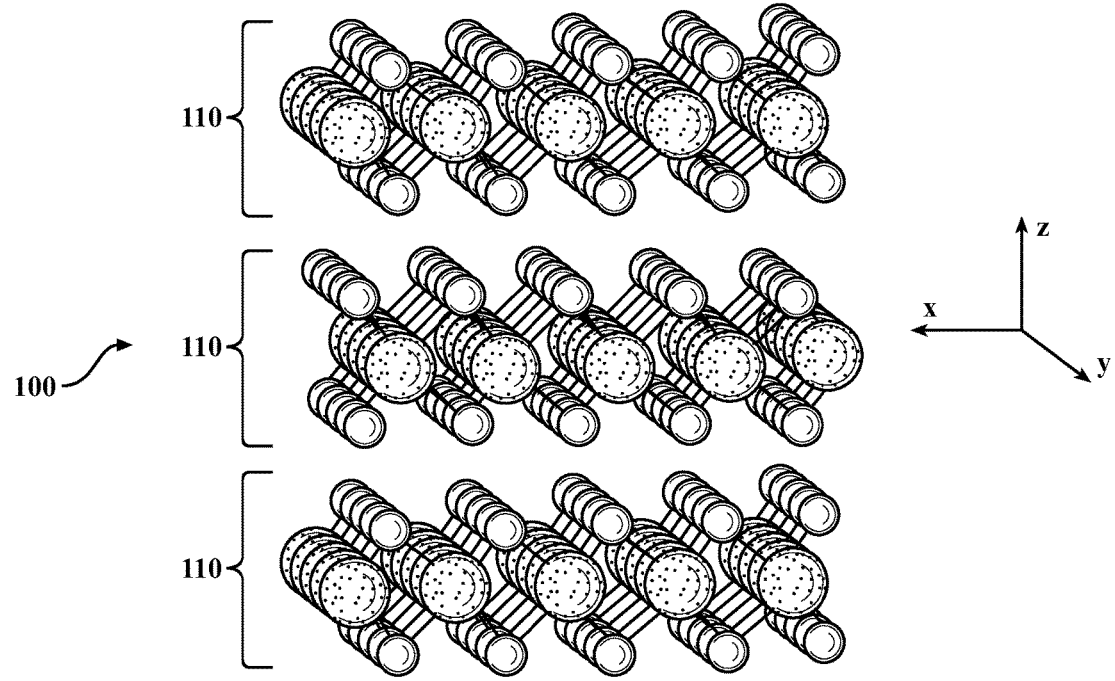
FIG. 1A is a schematic perspective view of a transition metal dichalcogenide of the present disclosure, shown at angstrom scale.

A transition metal dichalcogenide is typically present in a molecular structure comprising layered, two dimensional crystallites. A schematic view of a portion of such a structure is represented FIG. 1A, the portion occupying approximately one cubic nanometer at true scale. A layered structure of the type partially represented in FIG. 1A, alternatively referred to herein as a "stack" 100, includes at least one two-dimensional crystallite 110 (alternatively referred to as a "layer"). The exemplary portion of a stack 100 of FIG. 1A, includes three planar crystallites 110, the three crystallites 110 held in parallel adjacency relative to one another primarily by van der Waals forces. An actual transition metal dichalcogenide will typically extend in the x-axial and y-axial directions, as represented in FIG. 1A, for distances ranging from tens to thousands of nanometers or more. A stack 100 can include any number of crystallites, with bulk transition metal dichalcogenide typically existing in stacks having large numbers of crystallites 110; such as thousands, tens of thousands, or more.

Figure 1B:
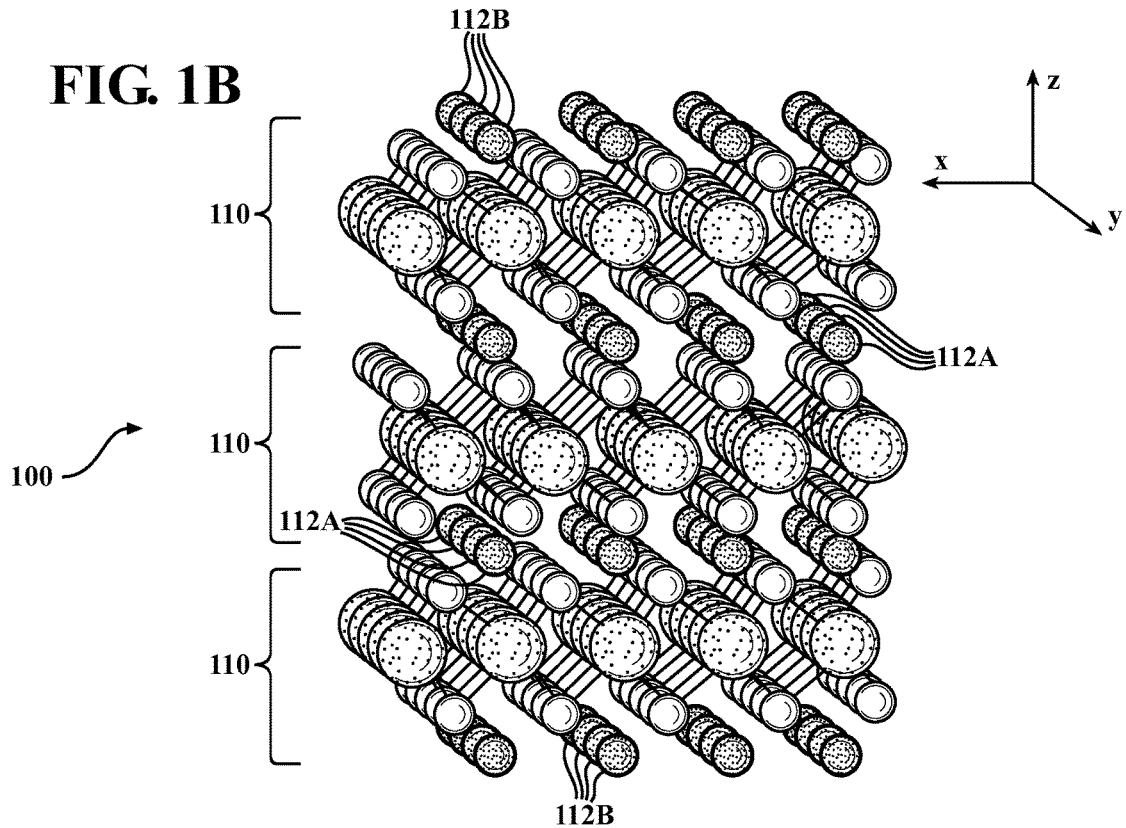
FIG. 1B is a schematic perspective view of a cation-intercalated, transition metal dichalcogenide of the present disclosure, shown from the perspective and at the scale of FIG. 1A.

It is possible to incorporate cations, for example by application of an electromotive force, into a transition metal dichalcogenide intercalatively or adsorptively. FIG. 1B shows the stack 100 of FIG. 1A having intercalated cations 112A and adsorbed cations 112B. As shown, intercalated cations occupy positions between two adjacent crystallites 110, whereas adsorbed cations 112B occupy positions adjacent to only one crystallite 110, said latter positions being at a surface of the stack 100.

In contrast to bulk transition metal dichalcogenide, "few-layer" transition metal dichalcogenide (alternatively referred to as transition metal dichalcogenide present in a few-layer configuration) are present in stacks having a small number of crystallites 110. In some implementations, a few-layer transition metal dichalcogenide is present in stacks having fewer than ten crystallites 110. In some implementations, a few-layer transition metal dichalcogenide is present in stacks having fewer than five crystallites 110. In some implementations, a few-layer transition metal dichalcogenide is present in stacks having fewer than four crystallites 110. In some implementations, a few-layer transition metal dichalcogenide is present in stacks having fewer than three crystallites 110. In some implementations, a few-layer transition metal dichalcogenide is present in stacks having fewer than two crystallites 110. The last of these can be referred to alternatively as a monolayer.

It will be appreciated that when bulk transition metal dichalcogenide is incorporated with cations, the vast preponderance are incorporated as intercalated cations 112A, whereas only a negligible proportion are incorporated as adsorbed cations 112B. Few-layer transition metal dichalcogenide, however, can incorporate a substantial proportion of cations by adsorption, and in the case of monolayer transition metal dichalcogenide, all incorporated cations will be adsorbed cations.

Bulk $TiS_2$ has an empirically determined electric potential for lithiation (electrochemical incorporation of lithium cations into the $TiS_2$ stack) of ~2.1 V vs. $Li/Li^+$. To determine the electric potential of lithium adsorption to $TiS_2$, lithiation of a $TiS_2$ monolayer was simulated by ab initio density functional theory calculations.

Density functional theory calculations were carried out using the Vienna ab initio Simulation Package (VASP) with projector augmented wave (PAW) pseudopotentials and the exchange-correlation functionals parameterized by Perdew, Burke, and Ernzerhof for the generalized gradient approximation (GGA). Numerical convergence criteria were chosen to be less than $10^{-5}$ eV for the electronic structure and 0.01 eV/Å for the geometry optimization at an energy cutoff of 400.0 eV. A DFT-D2 correction was included to account for van Der Waals forces. In order to simulate Li—Li interactions at non-dilute Li concentration, the cluster expansion method was applied, wherein the configurational dependent free-energy was treated as a polynomial of the effective cluster interaction. The details of the cluster expansion method can be found at A. Van der Ven, et al., Phys. Rev. B, 58, pg. 2975 (1998).

Figure 2:
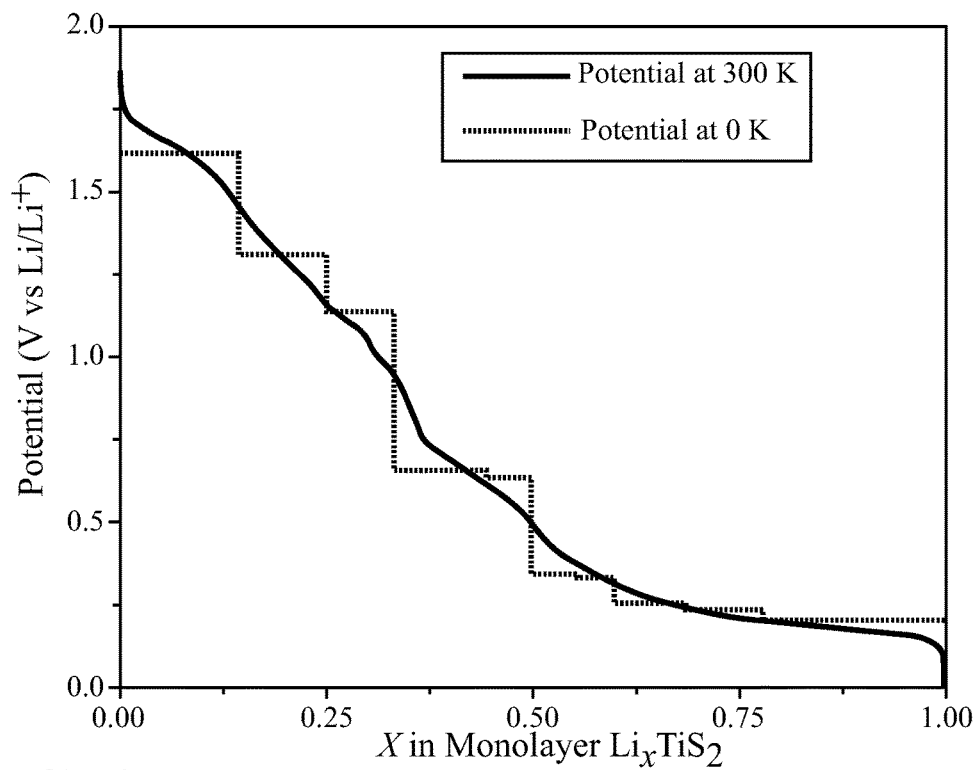
FIG. 2 is a graph of calculated electric potential of lithiation of a titanium disulfide monolayer vs. Li/Li$^+$.

Calculated potential as a function of the extent of lithiation is shown in FIG. 2. As shown in FIG. 2, lithiation of monolayer $TiS_2$, begins at about 1.7 V vs. $Li/Li^+$, the potential gradually diminishing to a final value of about 0.2 V vs. $Li/Li^+$ at a 1:1 lithium-to-titanium ratio. This yields an average potential for adsorptive lithiation of monolayer $TiS_2$ of about 0.722 V vs. $Li/Li^+$, a substantial decrease relative to the 2.1 V intercalative lithiation of bulk $TiS_2$.

The first-principles calculation depicted in FIG. 2 suggests that adsorptive lithiation on one side of the monolayer is nearly independent from adsorptive lithiation on the opposite side. Thus opposite side lithiation can be regarded as independent, and equivalent, processes. In this case, the average lithiation voltage is predicted to be 0.772 V vs $Li/Li^+$, while the gravimetric capacity is 478 mAh/g. This gravimetric capacity is approximately 1.3 times that of a state-of-the-art graphite anode, while the electric potential of lithiation is about 0.67 V higher. Although the higher electric potential of lithiation is indicative of a loss of energy density, it is also confers the benefit of avoiding or minimizing direct Li plating on the anode surface, with the concomitant possibility of dendrite formation. This is especially important for high rate applications where the operation requires high current density.

Figure 3A:
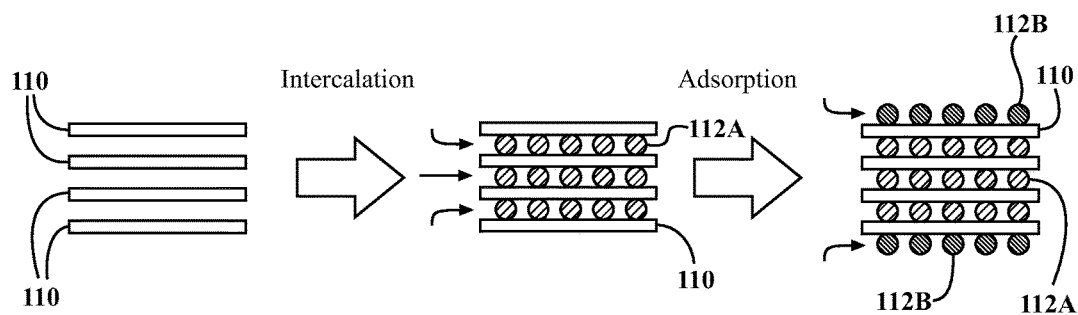
FIG. 3A is a schematic illustration of cation incorporation into a few-layered transition metal dichalcogenide by insertion and by adsorption.
Figure 3B:
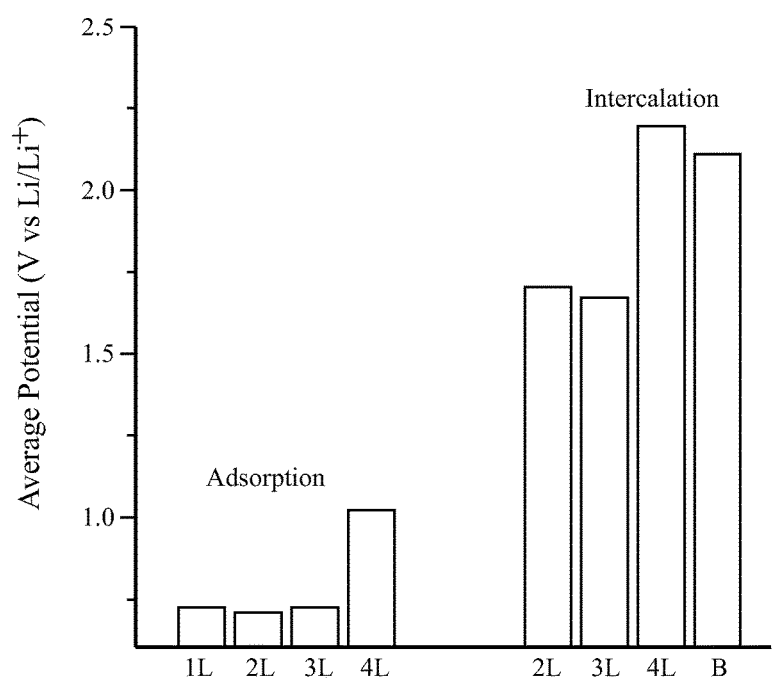
FIG. 3B is a bar graph of average electric potential for electroactive material insertion and adsorption of few-layer anode materials having differing numbers of layers.

FIG. 3A shows a schematic representation of intercalative and adsorptive lithiation of a $TiS_2$ stack having four layers. Calculated average electric potentials for intercalative and adsorptive lithiation of $TiS_2$ in various configurations, including stacks having one, two, three, or four layers (1L, 2L, 3L, and 4L respectively) as well as bulk $TiS_2$ (denoted "B") are shown in FIG. 3B. The calculations depicted in FIG. 3B show that the electric potential of intercalative incorporation is always higher than that of adsorptive incorporation. It is to be noted, in addition, that the calculated electric potential of 2.11 V for intercalation of lithium into bulk $TiS_2$ is in excellent agreement with the experimental value, thus supporting the reliability of the calculated values.

Figure 4:
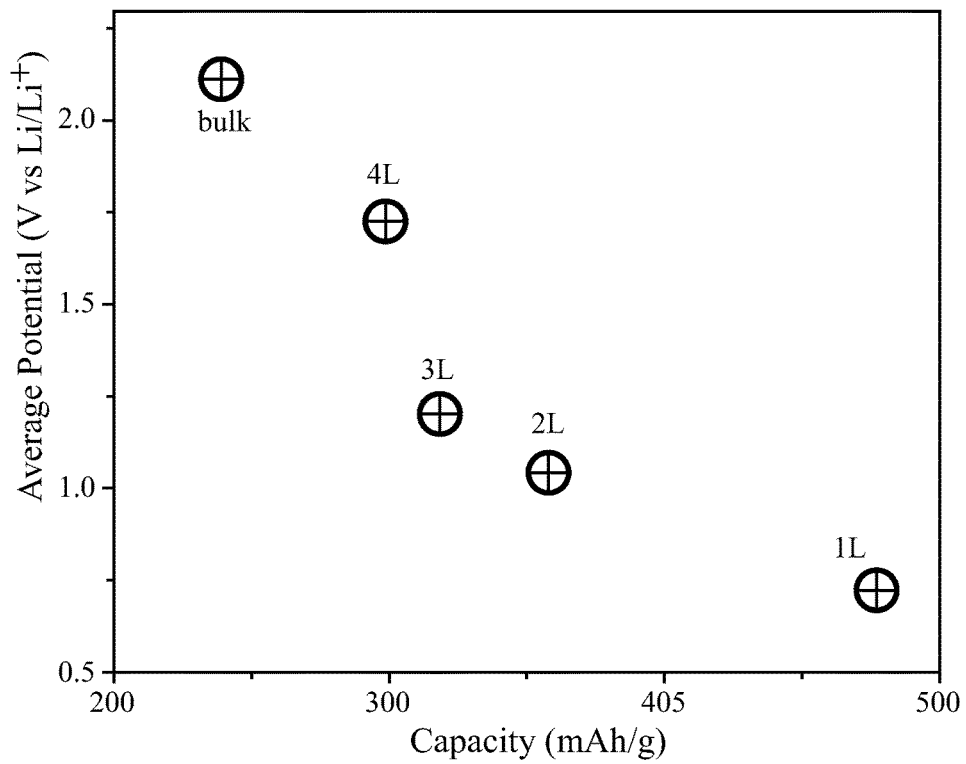
FIG. 4 is a graph of average electric potential vs. capacity for $TiS_2$ anode material having varying numbers of layers.

FIG. 4 shows the average lithiation voltage as a function of capacity for different layers of $TiS_2$. In general, the gravimetric capacity increases and the average electric potential of lithiation decreases with a decrease in the number of crystallites 110 present in the stack 100. This clearly suggests that whereas bulk $TiS_2$ is generally suitable only as a cathode material, few-layer $TiS_2$ is capable of functioning as an anode material opposite a wide variety of cathodes. This in combination with the relatively high gravimetric capacity of $TiS_2$ makes few-layer $TiS_2$ an excellent candidate for a Li-ion battery anode. More generally, these results indicate that transition metal dichalcogenides having high electric potentials for cation incorporation/disincorporation when in the bulk phase, can exhibit much lower electric potentials suitable for anodic use when in a few-layer configuration.

Thus an electrochemical cell is disclosed, having an anode, a cathode, and an electrolyte in ionic communication with at least one of the anode and the cathode. As used herein, the term "anode" refers to an electrode at which electrochemical oxidation occurs during cell discharge, and the term "cathode" refers to an electrode at which electrochemical reduction occurs during cell discharge. In the case of a secondary, or rechargeable, electrochemical cell, an anode can be an electrode at which electrochemical reduction occurs during cell charging, and a cathode can be an electrode at which electrochemical oxidation occurs during cell charging.

Because the few-layered transition metal dichalcogenide of the present disclosure has relatively low electric potential as compared to the analogous bulk material, it can be employed in an electrochemical cell as an anode material opposite a wide variety of cathodes, including cathodes with average-to-low electric potential. In some implementations, the cathode of the electrochemical cell can have an average electrode potential (vs. $Li/Li^+$) less than 5.0 V. In some implementations, the cathode of the electrochemical cell can have an average electrode potential (vs. $Li/Li^+$) less than 4.0 V. In some implementations, the cathode of the electrochemical cell can have an average electrode potential (vs. $Li/Li^+$) less than 3.0 V. In some implementations, the cathode of the electrochemical cell can have an average electrode potential (vs. $Li/Li^+$) less than 2.0 V.

In some implementations, the anode will have an average electrode potential (vs. $Li/Li^+$) less than 1.5 V, and in some implementations will have an average electrode potential (vs. Li/Li$^+$) less than 1.0 V. In some implementations, the electrochemical cell will have an electric potential difference between the cathode and the anode of at least 3.0 V. In some specific implementations, the electrochemical cell will be a Li-ion cell. In other specific implementations, the electrochemical cell will be a Na-ion cell.

In some implementations of the electrochemical cell, the few-layered transition metal dichalcogenide can be described as a carrier ion incorporation material of the anode, because carrier ion (such as Li$^+$) is commonly incorporated into the few-layered transition metal dichalcogenide during charging of the electrochemical cell, as described above. In some such implementations, a carrier ion incorporation material of the anode can be said to consist essentially of few-layered transition metal dichalcogenide. In such implementations, the few-layer transition metal dichalcogenide is not used in combination with graphene or other carrier ion incorporation materials Additionally disclosed is a method for fabricating an electrochemical cell. The method includes a step of placing a cathode in electrical communication with an anode comprising a few-layer transition state dichalcogenide.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An electrochemical cell having:
   a cathode;
   an anode comprising a transition metal dichalcogenide in a few-layer configuration with stacks having fewer than ten layers, each layer comprising a two-dimensional crystallite; and
   an electrolyte in ionic communication with at least one of the cathode and the anode.

2. The electrochemical cell as recited in claim 1, wherein the transition metal dichalcogenide is a transition metal sulfide.

3. The electrochemical cell as recited in claim 1, wherein the transition metal dichalcogenide is titanium sulfide.

4. The electrochemical cell as recited in claim 1, wherein the cathode has an average electrode potential less than 5.0 V vs. Li/Li$^+$.

5. The electrochemical cell as recited in claim 1, wherein the cathode has an average electrode potential less than 4.0 V vs. Li/Li$^+$.

6. The electrochemical cell as recited in claim 1, wherein the cathode has an average electrode potential less than 3.0 V vs. Li/Li$^+$.

7. The electrochemical cell as recited in claim 1, wherein the cathode has an average electrode potential less than 2.0 V vs. Li/Li$^+$.

8. The electrochemical cell as recited in claim 1, wherein the electrochemical cell is a sodium-ion cell.

9. The electrochemical cell as recited in claim 1, wherein the electrochemical cell is a lithium-ion cell.

10. The electrochemical cell as recited in claim 1, wherein the anode incorporates active material cations as both intercalated cations and adsorbed cations, the adsorbed cations comprising at least 40% of the incorporated active material cations.

11. A lithium-ion electrochemical cell comprising:
    a cathode;
    an anode comprising a transition metal dichalcogenide in a few-layer configuration with stacks having fewer than five layers, each layer comprising a two-dimensional crystallite; and
    an electrolyte in ionic communication with at least one of the cathode and the anode.

12. The lithium-ion electrochemical cell as recited in claim 11, wherein the cathode has an average electrode potential less than 5.0 V vs. Li/Li$^+$.

13. The lithium-ion electrochemical cell as recited in claim 11, wherein the cathode has an average electrode potential less than 4.0 V vs. Li/Li$^+$.

14. The lithium-ion electrochemical cell as recited in claim 11, wherein the cathode has an average electrode potential less than 3.0 V vs. Li/Li$^+$.

15. The lithium-ion electrochemical cell as recited in claim 11, wherein the cathode has an average electrode potential less than 2.0 V vs. Li/Li$^+$.

16. The lithium-ion electrochemical cell as recited in claim 11, wherein the transition metal dichalcogenide is present in a few-layer configuration having fewer than four layers.

17. The lithium-ion electrochemical cell as recited in claim 11, wherein the transition metal dichalcogenide is present in a few-layer configuration having fewer than three layers.

18. The lithium-ion electrochemical cell as recited in claim 11, wherein the transition metal dichalcogenide is present in a few-layer configuration having fewer than two layers.

19. A method for fabricating an electrochemical cell, comprising placing a cathode in electrical communication with an anode having transition metal dichalcogenide configured in stacks having fewer than five layers.

* * * * *